(12) United States Patent
Wittbracht et al.

(10) Patent No.: US 10,605,323 B2
(45) Date of Patent: Mar. 31, 2020

(54) ELASTOMER BEARING

(71) Applicants: BOGE ELASTMETALL GMBH, Damme (DE); FORD-WERKE GMBH, Cologne (DE)

(72) Inventors: Frank Wittbracht, Borgholzhausen (DE); Josef Burwinkel, Dinklage (DE); Stefan Loheide, Wallenhorst (DE); Achim Lordick, Cologne (DE); Thomas Schmitz, Essen (DE); Marc Mendel, Haan (DE)

(73) Assignees: Ford-Werke GmbH, Cologne (DE); Boge Elastmetall GmbH, Damme (DE)

( * ) Notice: Subject to any disclaimer, the term of this patent is extended or adjusted under 35 U.S.C. 154(b) by 0 days.

(21) Appl. No.: 16/072,752

(22) PCT Filed: Jan. 25, 2017

(86) PCT No.: PCT/EP2017/051574
§ 371 (c)(1),
(2) Date: Jul. 25, 2018

(87) PCT Pub. No.: WO2017/129635
PCT Pub. Date: Aug. 3, 2017

(65) Prior Publication Data
US 2019/0040928 A1    Feb. 7, 2019

(30) Foreign Application Priority Data

Jan. 26, 2016  (DE) .......................... 10 2016 101 310

(51) Int. Cl.
*F16F 13/14*  (2006.01)

(52) U.S. Cl.
CPC .... *F16F 13/1463* (2013.01); *F16F 2228/066* (2013.01)

(58) Field of Classification Search
CPC .. F16F 13/08; F16F 13/10; F16F 13/20; F16F 13/26
(Continued)

(56) References Cited

U.S. PATENT DOCUMENTS

| 3,348,835 A * | 10/1967 | Casey | F16F 9/0218 267/64.14 |
| 7,306,210 B2 * | 12/2007 | Happou | F16F 13/105 267/140.13 |
| 2013/0300042 A1 * | 11/2013 | Lamers | F16F 13/1409 267/140.11 |

FOREIGN PATENT DOCUMENTS

| CN | 100543338 C | 9/2009 |
| DE | 19948307 A1 | 4/2001 |

(Continued)

*Primary Examiner* — Christopher P Schwartz
(74) *Attorney, Agent, or Firm* — Brooks Kushman P.C.; Ray Coppiellie (57) ABSTRACT

An elastomer bearing has an inner part, an outer sleeve that surrounds the inner part, and an elastomer body that is arranged between the inner part and the outer sleeve. The elastomer body extends from the inner part as far as the outer sleeve. The elastomer body comprises two liquid chambers, which are filled with a liquid and arranged one on top of the other in an axial direction, and a duct carrier arranged radially between the elastomer body and the outer sleeve. The duct carrier surrounds the elastomer body in a region of the liquid chambers and bounds the chambers. The elastomer body is vulcanized to the inner part. To reinforce the elastomer body, two, annular reinforcement inlays are embedded in the elastomer body, and form parts, separate from one another, of a cage that is embedded in the elastomer body.

16 Claims, 4 Drawing Sheets

(58) Field of Classification Search
USPC .............. 267/140.11–140.15, 140.2–140.5,
267/141.1–141.7; 248/550, 562, 566
See application file for complete search history.

(56) References Cited

FOREIGN PATENT DOCUMENTS

| | | |
|---|---|---|
| DE | 19959391 A1 | 7/2001 |
| DE | 10146154 A1 | 4/2003 |
| DE | 10213627 A1 | 10/2003 |
| DE | 102006032633 A1 | 1/2008 |
| WO | 0142681 A1 | 6/2001 |
| WO | 2012002402 A1 | 1/2012 |
| WO | 2012095141 A1 | 7/2012 |

* cited by examiner

ELASTOMER BEARING

CROSS-REFERENCE TO RELATED APPLICATIONS

This application is the U.S. National Phase of PCT Application No. PCT/EP/2017/051574 filed Jan. 25, 2017, which claims priority to German Patent Application No. 10 2016 101 310.2 filed Jan. 26, 2016, the disclosure of which is incorporated in the entirety by reference herein.

TECHNICAL FIELD

The disclosure relates to an elastomer bearing that has at least two liquid chambers filled with a liquid and connected by at least two ducts.

BACKGROUND

The prior art has disclosed solutions for reducing rigidity of hydraulically damping elastomer bearings for defined amplitudes. However, these solutions do not permit a quasi-static exchange of fluid between liquid chambers, and, therefore, also do not ensure reduction of the rigidity, independently of an initial load. There is therefore a desire to be able to achieve a reduction in rigidity for defined amplitudes, in particular small amplitudes, wherein a decoupling of an amplitude in a certain force range is to be preferably independent of an initial load.

DE 199 59 391 A1 discloses a hydraulically damping bearing with two chambers that are filled with a hydraulic liquid, and connected to one another via at least one overflow duct and at least one decoupling duct, wherein a movable, oscillatory body that is displaceable along the decoupling duct is accommodated in the decoupling duct, and wherein a device for applying a variable force to the oscillatory body is provided in order to change rigidity properties of the bearing. The oscillatory body is embodied as a hollow cylinder with a dividing wall in which a borehole is provided.

The device for applying the variable force to the oscillatory body of the abovementioned bearing comprises e.g. at least one coil for generating a magnetic field that acts on the oscillatory body, which is fabricated from a magnetic material, so that, by varying the exciter current of the coil, a force applied to the oscillatory body can be varied continuously. Implementing the bearing therefore involves considerable structural and electronic expenditure, which makes the bearing more expensive. Although particularly fine adjustability of the rigidity is possible with this bearing, this is not always necessary in practice. In addition, an integrated orifice in the oscillatory body reduces miniaturization. However, miniaturization is desired in order, on the one hand, to limit installation space and, on the other, to be able to set a clearance by which an inner part can be moved relative to an outer part with the highest possible accuracy until a progression of the bearing rigidity occurs.

SUMMARY

Taking this as a basis, the disclosure is based on an object of providing a relatively simple, in particular relatively cost-effective, solution that varies rigidity of a bearing.

The elastomer bearing according to the disclosure has an inner part, an outer part that surrounds the inner part, and an elastomer body, which is arranged between the inner part and the outer part, is connected both to the inner part and to the outer part, and comprises at least two liquid chambers filled with a liquid and connected to one another by at least two ducts, wherein a bidirectionally acting valve is provided in a first of the ducts. The elastomer body preferably extends from the inner part as far as the outer part.

The first duct can be opened and/or closed by the bidirectionally acting valve, in particular in each direction of flow. A simple, possible way of varying a rigidity of the elastomer bearing is therefore provided. In addition, a bidirectionally acting valve can be implemented relatively, cost-effectively, in particular if the bidirectionally acting valve is embodied as a bidirectionally acting ball valve.

The elastomer body is preferably connected in a frictionally locking, or materially joined fashion to the inner part, is, for example vulcanized onto the latter. In addition, the elastomer body is preferably connected in a frictionally locking, or materially joined fashion, to the outer part, for example vulcanized onto the latter. In particular, the elastomer body is arranged under prestress between the inner part and the outer part. The elastomer bearing can also be referred to e.g. as a hydraulic bearing. For example, the elastomer bearing is a hydraulically damping, elastomer bearing.

The elastomer body advantageously comprises elastically deformable chamber walls, which bound the liquid chambers, and act, in particular, as dent springs. The elastomer bearing preferably has interfaces by which forces can be input into the elastomer bearing. The interfaces preferably comprise the inner part and the outer part, and/or are formed by the inner part and the outer part. In particular, the elastomer body is connected between the interfaces. The elastomer bearing preferably comprises a system that is capable of oscillating, which has, in particular, the chamber walls, or at least the chamber walls that act as dent springs, the liquid chambers and the ducts. The system that is capable of oscillating is preferably connected between the interfaces. With respect to the interfaces, the system that is capable of oscillating is therefore connected in parallel, in particular with the elastomer body or parts of the elastomer body.

If dynamic forces are input into the bearing and the dynamic forces give rise to movements of the inner part relative to the outer part, and these movements are damped by the elastomer body and/or the system that is capable of oscillating. If the dynamic forces have a low frequency, the damping of the movements takes place predominantly by elastic deformations of the elastomer body. Although deformation of the elastomer body generally, also gives rise to deformation of the liquid chambers, at low frequencies liquid can, however, be exchanged practically, freely, or without impediment between the liquid chambers through the ducts, or at least through the second duct that forms, in particular, an overflow duct. However, as a frequency of the dynamic forces increases, the system that is capable of oscillating contributes increasingly to the damping. In this sense, a contribution of the system that is capable of oscillating to the damping assumes a maximum at a resonance frequency, which is determined, in particular, by a structural configuration of the system that is capable of oscillating, and/or by viscosity of the liquid and/or density thereof. If the frequency of the dynamic forces exceeds the resonance frequency, the liquid, in particular in the overflow duct, can no longer follow input forces, or can only follow input forces with a delay, so that the rigidity of the elastomer bearing increases as the frequency rises. However, if amplitudes of the movements of the inner part relative to the outer part are low, it is possible, in particular within a defined frequency range, preferably even at relatively high frequencies, for a virtually unimpeded exchange of liquid between the liquid chambers through a decoupling duct, which is formed, in particular, by the first duct.

The decoupling duct is preferably shorter than the overflow duct. In addition, the decoupling duct preferably has a larger flow cross section than the overflow duct. Through the decoupling duct, it is therefore possible to bypass the overflow duct for a specific frequency range. However, the decoupling duct as such offers only an unsatisfactory possible way of limiting amplitudes of the movements. Such a limitation is, however, desired since the decoupling duct is intended to be effective only for a low amplitude. According to the disclosure, such a limitation is achieved by the bidirectionally acting valve, which closes or closes off the first duct in particular starting from a predefined movement amplitude, and/or a volume of liquid that has passed through the first duct in a direction of flow. Therefore, in a shut or closed off state of the valve, the rigidity increases, in particular by virtue of dent springs of the elastomer body, which now act and, by virtue of pressure that acts in the liquid chambers and counteracts as an additional force, a further movement of the inner part relative to the outer part, via active faces of the liquid chambers.

According to one development, the bidirectionally acting valve can assume two closed states. In a first closed state of the valve or in a first of the closed states of the valve, a flow of liquid in the first duct in a first direction of flow through the valve is preferably closed off. However, in particular in the first closed state of the valve a flow of liquid in the first duct is cleared and/or enabled in a second direction of flow, which is opposed to the first direction of flow, through the valve. In a second closed state of the valve or in a second of the closed states of the valve, a flow of liquid in the first duct is preferably closed in the direction of flow or in a second direction of flow, which is opposed, in particular, to the first direction of flow, through the valve. However, in particular in the second closed state of the valve, a flow of liquid in the first duct is cleared and/or enabled in the first direction of flow through the valve. In addition, the valve can preferably assume an opened state or a state in which the valve is opened to a limited degree. In the or an opened state of the valve or in the or a state of the valve in which the valve is opened to a limited degree, a flow of liquid in the first duct is preferably cleared and/or enabled, in particular in the direction of flow and/or in the second direction of flow and/or in every direction of flow and/or in both directions of flow, through the valve. In the opened state of the valve or in the state in which the valve is opened to a limited degree, a flow of liquid in the first duct is advantageously cleared and/or enabled, in particular per direction of flow, but only up to a predetermined volume of liquid. If this predetermined volume of liquid is achieved for one of the directions of flow, in particular the closed state that is assigned to the one of the directions of flow is assumed by the valve, and a further flow of liquid in the one of the directions of flow is closed off.

The bidirectionally acting valve can preferably be activated by liquid flowing in the first duct and/or by liquid flowing through the first duct. Therefore, an external control device that activates the valve can be dispensed. The bidirectionally acting valve can advantageously be transferred, in particular from the opened state, into the first closed state by a flow of liquid in the first direction of flow. The bidirectionally acting valve can preferably be transferred, in particular from the opened state, into the second closed state by a flow of liquid in the second direction of flow. The bidirectionally acting valve can preferably be transferred from the first closed state to the opened state by a flow of liquid in the second direction of flow. The bidirectionally acting valve can advantageously be transferred from the second closed state into the opened state by a flow of liquid in the first direction of flow.

According to one refinement, the bidirectionally active valve limits, or can limit, a flow of liquid through the first duct, in particular in the first direction of flow and/or in the second direction of flow and/or in every direction of flow, to the or to a predefined volume of liquid. It is therefore possible, within the scope of the predefined volume of liquid, to permit an exchange of liquid between the chamber and/or through the first duct, in particular in the first direction of flow and/or in the second direction of flow and/or in every direction of flow, and/or in the respective direction of flow, and to close off or limit an exchange of liquid above that, in particular in the first direction of flow and/or in the second direction of flow and/or in every direction of flow and/or in the respective direction of flow.

According to one embodiment, the valve has two valve seats that are arranged at a distance from one another, and a shut-off body that is movably arranged between the latter. In particular, the shut-off body is arranged in the first duct and/or in a duct section of the first duct, wherein the valve seats are preferably provided or arranged in the first duct, or at ends of the first duct and/or in the duct section or at ends of the duct section. The shut-off body can preferably be applied to each of the valve seats, in particular in a liquid-sealing fashion. For example, the valve seats are formed by sealing rings. The shut-off body can preferably be moved by liquid flowing in the first duct and/or by the liquid flowing in the first duct, in particular in the first duct and/or along the first duct and/or between the valve seats. In this sense, the shut-off body preferably forms a decoupling element. The shut-off body is preferably embodied in a spherical shape and/or forms a ball. The bidirectionally acting valve forms, in particular, a bidirectionally acting ball valve. The shut-off body can preferably be applied to each of the valve seats, in particular in a liquid-sealing fashion, by liquid flowing in the first duct and/or by the liquid flowing in the first duct. The first closed state is preferably assigned to a first of the valve seats, and the second closed state to a second of the valve seats. In particular, in the first closed state, the shut-off body bears against the first valve seat, preferably in a liquid-sealing fashion. Preferably, in the second closed state, the shut-off body bears against the second valve seat, preferably in a liquid-sealing fashion. A clearance, by which the inner part can move relative to the outer part until the valve is closed, is dependent, in particular, on a ratio of a duct cross section with respect to active faces of the liquid chambers, and on a length of a movement travel path of the shut-off body in the first duct.

According to one refinement, the valve has an, in particular tubular, valve body in or on which, in particular, the valve seats are provided, between the valve seats, the shut-off body is arranged in a movable fashion in the valve body. The valve seats are preferably provided at the ends of the valve body. An interior of the valve body forms, in particular, the first duct, a part of the first duct and/or the duct section of the first duct. In this sense, the interior of the valve body is preferably considered to be part of the first duct and/or of the duct section.

A diameter or internal diameter of the first duct between the valve seats is advantageously greater than or equal to or approximately equal to a diameter or external diameter of the shut-off body. The diameter or external diameter of the shut-off body is, for example, adapted to or approximately adapted to the diameter or internal diameter of the first duct between the valve seats. It is therefore possible to avoid a situation in which liquid, or too much liquid, flows past the shut-off body and the latter cannot be moved along with the flow of the liquid, or not to a desired degree. The first duct preferably has a circular and/or constant cross section or internal cross section between the valve seats.

A zero position or position of rest of the shut-off body in the first duct is preferably assigned to the valve and/or to the opened state of the valve or state of the valve in which the valve is opened to a limited degree. The opened state of the valve, or state of the valve in which the valve is opened to a limited degree is preferably defined by the, or a zero, position or position of rest of the shut-off body in the first duct. The position of rest, or zero position, is located, in particular, between the valve seats. In the opened state of the valve, in particular initially, the shut-off body is advantageously located in the zero position or position of rest. The expression "in particular initially" takes into account a fact that the shut-off body can preferably be moved by liquid flowing in the first duct and/or by the liquid flowing in the first duct.

A first of the valve seats and/or a first closed position of the shut-off body is preferably assigned to the first closed state of the valve. In particular, in the first closed state and/or in the first closed position, the shut-off body bears on the first valve seat, preferably in a liquid-sealing fashion. A second of the valve seats and/or a second closed position of the shut-off body is advantageously assigned to the second closed state of the valve. In particular, in the second closed state and/or in the second closed position, the shut-off body is located on the second valve seat, preferably in a liquid-sealing fashion. The position of rest or zero position of the shut-off body is located, in particular, between the closed positions.

The first duct can run overall in a straight fashion between the valve seats. However, the first duct preferably runs in a curved or V shape between the valve seats, and/or the first duct is preferably embodied in a curved shape or V shape between the valve seats. Given suitable, spatial orientation of the elastomer bearing, the shut-off body can therefore be transferred into a defined position owing to gravity or to the Earth's gravitational pull. However, additionally or alternatively, it is also possible for a restoring mechanism to be provided by which the shut-off body can be transferred into the or a defined position, for example by spring force or magnetically. A magnetic restoring mechanism can comprise e.g. a permanent magnet that is arranged in a region of the defined position, and acts in a magnetically attracting fashion on the shut-off body, which for this purpose preferably comprises a ferromagnetic material or is formed therefrom. For example, the first duct and/or the duct section comprises two duct limbs that preferably join one another in a junction region, and are preferably at an angle with respect to one another. In particular, the valve seats are provided at ends of the duct limbs that face away from one another. The duct limbs are preferably, each embodied in a straight or curved fashion. The junction region preferably forms the defined position. The defined position is preferably located between the valve seats. In particular, the defined position corresponds to the zero position or position of rest. The valve body comprises, for example, the duct limbs.

According to one development, the restoring mechanism comprises at least one spring, which forces the shut-off body into the or a defined position. According to another development, the restoring mechanism comprises at least one magnet that is preferably arranged in a region of the or of a defined position, wherein the shut-off body has, in particular, ferromagnetic properties. The magnet is preferably a permanent magnet. The shut-off body is preferably composed, in particular at least partially, of a magnetic or ferromagnetic material. The defined position preferably corresponds to the zero position or position of rest.

The elastomer bearing is preferably oriented with respect to a surface of Earth in such a way that the first duct has a lowest point (low point) between the valve seats, in particular below them. This is appropriate, in particular, when the first duct is formed in a curved shape or V shape between the valve seats. The low point and/or the lowest point preferably corresponds to the junction region and/or is provided therein and/or formed thereby.

The second duct or a second of the ducts preferably has a lower hydraulic resonant frequency than the first duct. In particular, a diameter of the first duct is larger than a diameter of the second duct or of a second of the ducts. The second duct or a second of the ducts preferably forms an overflow duct. A length of the first duct is preferably shorter than a length of the second duct or a second of the ducts. The second duct or a second of the ducts preferably runs in a meandering shape.

The second duct preferably forms with the dent springs a, preferably low-frequency, resonant system above whose resonant frequency the second duct is inactive, so that the first duct can act. In contrast, for very low frequencies, the second duct is, in particular, open and brings about quasi-static equalization of liquid in order to compensate for different, initial loads. The resonant system preferably forms part of the system that is capable of oscillating.

The inner part preferably extends in an axial direction. In particular, a recess or borehole that passes through in an axial direction extends through the inner part. The inner part is preferably embodied in a cylindrical or essentially cylindrical fashion. The inner part is advantageously composed of plastic or metal, in particular of steel, of aluminum or of magnesium.

The output part preferably extends in the axial direction. The inner part and the outer part are advantageously arranged coaxially. In particular, the outer part is embodied as a sleeve and can therefore also be referred to as an outer sleeve. The outer part is preferably embodied in a cylindrical or essentially cylindrical fashion. The outer part is advantageously composed of plastic or metal, in particular of steel, of aluminum or of magnesium.

The elastomer body is preferably composed of an elastomer material, for example of rubber. The liquid chambers are arranged, in particular, offset axially with respect to one another. Alternatively, the liquid chambers are arranged offset with respect to one another in a circumferential direction, for example. The liquid chambers are preferably separated from one another, in particular in the axial direction or in the circumferential direction. The liquid chambers are advantageously separated from one another, in particular in the axial direction or in the circumferential direction, by the elastomer body.

The shut-off body is composed e.g. of plastic or metal. The shut-off body is preferably composed of solid material. The shut-off body advantageously has a closed surface. In particular, no through-hole for liquid to pass through is provided in the shut-off body.

According to one refinement, a duct carrier is provided in which the ducts are provided. The duct carrier is embodied, in particular, in an annular shape or partial annular shape. The duct carrier is composed, for example, of two, half shells or multiple partial shells. The duct carrier is advantageously arranged, in particular in a radial direction, between the inner part and the outer part and/or between the elastomer body and the outer part. The duct carrier preferably surrounds the inner part and/or the elastomer body in the region of the liquid chambers. In particular, the duct carrier surrounds the liquid chambers. The liquid chambers are advantageously bounded by the elastomer body and the duct carrier. The duct carrier is preferably composed of plastic. The provision of the ducts in the duct carrier provides an advantage that a decoupling amplitude and/or rigidity properties can be adapted by installing a suitably embodied duct carrier in the elastomer bearing without having to change dimensions and/or geometry of the elastomer body and/or of the elastomer bearing. It is therefore possible to prefabricate different duct carriers for different decoupling amplitudes and/or rigidity properties, wherein other components of the elastomer bearing can remain unchanged. The ducts are formed e.g. as grooves in an outer surface of the duct carrier, which grooves are preferably bounded in a radially outer direction by the outer part. The second duct is preferably formed as a groove in the outer surface of the duct carrier, which groove is preferably bounded in the radially outer direction by the outer part. The first duct is advantageously formed in the outer surface of the duct carrier as a groove, which is preferably bounded in the radially outer direction by the outer part. The valve body is, for example, formed by the duct carrier.

The elastomer bearing is preferably assigned a longitudinal center axis that runs, in particular, in the axial direction. In addition, the elastomer bearing is preferably assigned a radial direction that runs, in particular, perpendicularly with respect to the longitudinal center axis and/or perpendicular with respect to the axial direction. The term "radial" and/or the term the or a radial direction is preferably to be understood as meaning a direction or any direction that runs perpendicularly with respect to the longitudinal center axis and/or perpendicular with respect to the axial direction.

The outer part is preferably embodied in a rotationally symmetrical fashion or essentially, rotationally symmetrical fashion with respect to the longitudinal center axis. In addition, the inner part is preferably embodied in a rotationally symmetrical fashion or essentially rotationally symmetrical fashion with respect to the longitudinal center axis.

According to one development, the first duct and/or the duct section has an apex point, which is located between the valve seats. In particular, the apex point is offset axially with respect to the valve seats, preferably in a same direction. The valve seats are preferably located at a same height in or with respect to the axial direction. The apex point forms, in particular, the defined position and/or the zero position or position of rest and/or the lowest point and/or the low point. The apex point is advantageously formed by the junction region, or the apex point forms the junction region.

According to one refinement, the elastomer bearing forms a machine part. In particular, the elastomer bearing is installed in a machine. The inner part is preferably connected to a first machine part and the outer part to a second machine part. The machine is e.g. a vehicle, in particular a motor vehicle. The first and second machine parts are preferably vehicle parts.

According to one preferred embodiment, active faces of the liquid chambers are very much larger than a cross-sectional face of the first duct. Decoupling of very small excitation amplitudes is made possible by hydraulic transmission of the active faces of the liquid chambers to the cross-sectional face of the first duct. The active faces of the liquid chambers are preferably defined or formed by chamber walls or the chamber walls of the liquid chambers. The chamber walls that define or form the active faces are preferably formed by the elastomer body. In particular, a clearance or free movement path of the shut-off body (decoupling element) within the first duct is significantly larger than the amplitude that is to be decoupled.

The elastomer body preferably permits rigidity for defined travel excitations to be lowered by virtue of a fact that a specific volume of liquid can be exchanged between the liquid chambers (working chambers). Above these excitation amplitudes, the first duct, which is responsible for decoupling the liquid chambers, closes, by the bidirectionally acting valve, which is preferably embodied as a bidirectionally acting ball valve. The second duct, which preferably has a lower resonance than the first duct, nevertheless preferably permits liquid to be exchanged between the liquid chambers for slow movements at high amplitudes. Therefore, the elastomer bearing can implement decoupling of the liquid chambers when there are dynamic excitations with low amplitudes given different initial loads.

The functional capability of the elastomer bearing, preferably given different initial loads, is ensured, in particular, by a fact that the shut-off body, which is used for decoupling, can be moved or is moved into the or a defined position or zero position by a restoring force, in particular in so far as only quasi-static excitations of the elastomer bearing are present. In this context, the restoring force can be generated from a normal force acting on the shut-off body in the preferably V-shaped duct section within the first duct, as originates, for example, from gravity. Alternative mechanisms such as e.g. spring forces or magnetic interactions that generate a restoring force are also conceivable.

A preferred aspect of the disclosure therefore relates to a combination of two ducts (working ducts), wherein a first of the ducts comprises a bidirectionally acting valve that bounds, in particular above a defined exchange of liquid between the chambers via the first duct, in combination with a second of the ducts, which preferably has a smaller hydraulic resonant frequency than the first duct.

The disclosure will be described below on the basis of a preferred embodiment and with reference to the drawing, in which:

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
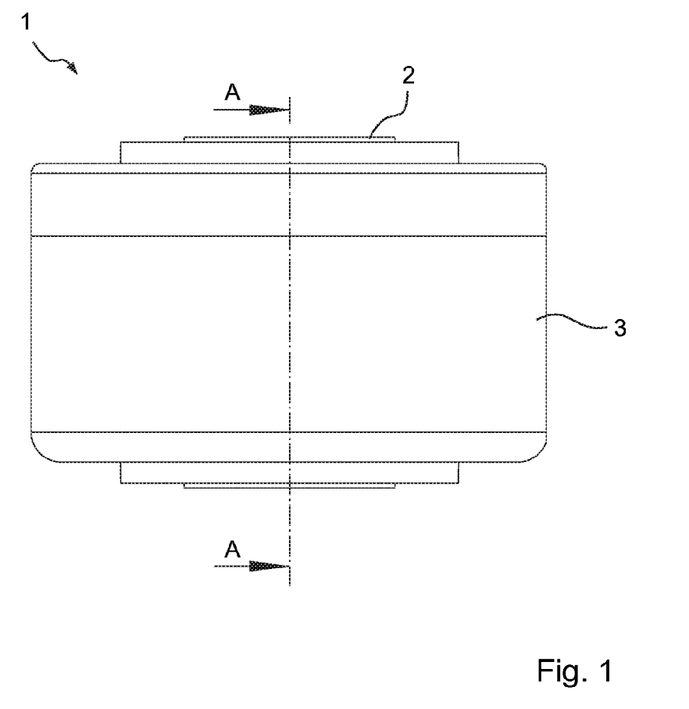
FIG. 1 shows a side view of an elastomer bearing according to an embodiment.
Figure 2:
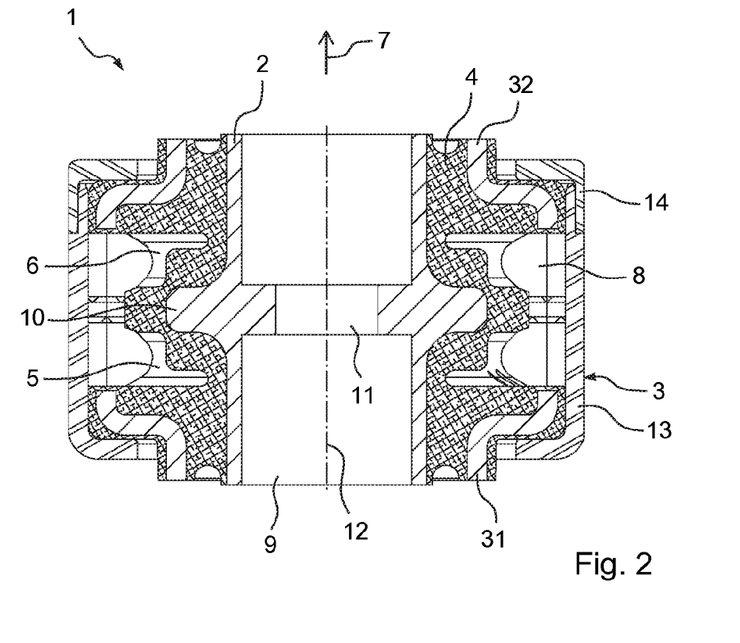
FIG. 2 shows a longitudinal section through the elastomer bearing along the sectional line A-A that can be seen in FIG. 1.

FIG. 1 shows a side view of an elastomer bearing 1 according to an embodiment, wherein FIG. 2 shows a longitudinal section through the elastomer bearing 1 along sectional line A-A, which can be seen in FIG. 1. The elastomer bearing 1 has an inner part 2, an outer sleeve 3 that surrounds the inner part 2, an elastomer body 4 that is arranged between the inner part 2 and the outer sleeve 3, extends from the inner part 2 as far as the outer sleeve 3 and comprises two liquid chambers 5 and 6, which are filled with a liquid and arranged one on top of the other in an axial direction 7, and a duct carrier 8 that is arranged radially between the elastomer body 4 and the outer sleeve 3, surrounds the elastomer body 4 in a region of the liquid chambers 5 and 6, and, together with the elastomer body 4, bounds the chambers 5 and 6. The elastomer body 4 is connected, in a materially joined fashion, to the inner part 2, in particular is vulcanized thereto. In addition, in order to reinforce the elastomer body 4 in certain areas, two annular reinforcement inlays 31 and 32 are embedded in the elastomer body, and form either elements or parts, separate from one another, of a cage that is embedded in the elastomer body.

The inner part 2 extends in the axial direction 7, is of an essentially cylindrical design and provided with an axially continuous cutout 9. In addition, the inner part 2 has an annular region 10 with a relatively large outer diameter between the two chambers 5 and 6, wherein the annular region 10 is embedded in the elastomer body 4. In addition, the inner part 2 is embodied in such a way that the cutout 9 has a constriction 11 at a location of the annular region 10.

The elastomer bearing 1 and/or the inner part 2 and/or the outer sleeve 3 are assigned a longitudinal center axis 12, which extends in the axial direction 7 and with respect to which the inner part 2 is rotationally symmetrical. In addition, the outer sleeve 3 is rotationally symmetrical to the longitudinal center axis 12, with a result that the inner part 2 and the outer sleeve 3 are arranged coaxially. As apparent from FIG. 2, the outer sleeve 3 is composed of two, sleeve-shaped parts 13 and 14 that are expedient for reasons of mounting, but are not absolutely necessary.

Figure 3:
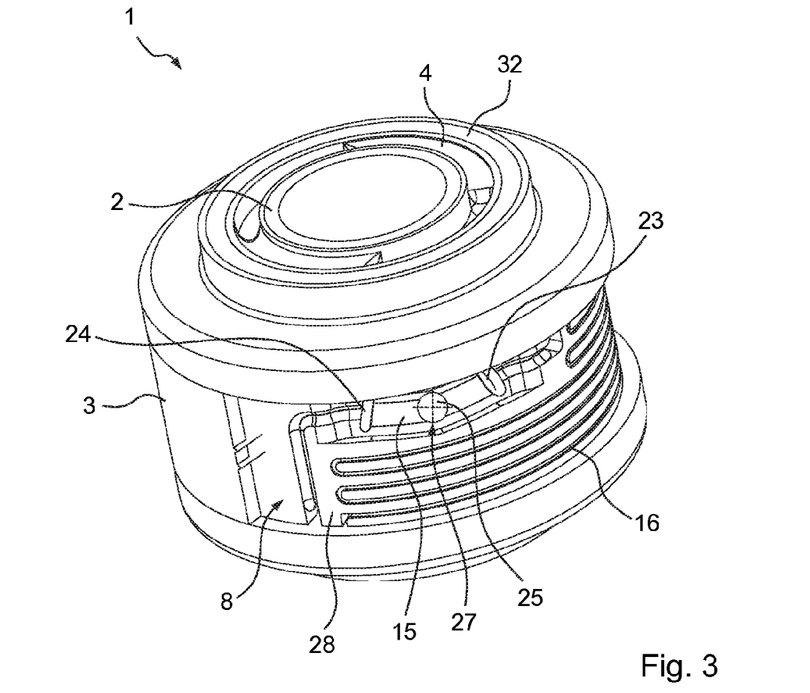
FIG. 3 shows a perspective view of the elastomer bearing, wherein part of an outer sleeve of the elastomer bearing has been omitted.
Figure 4:
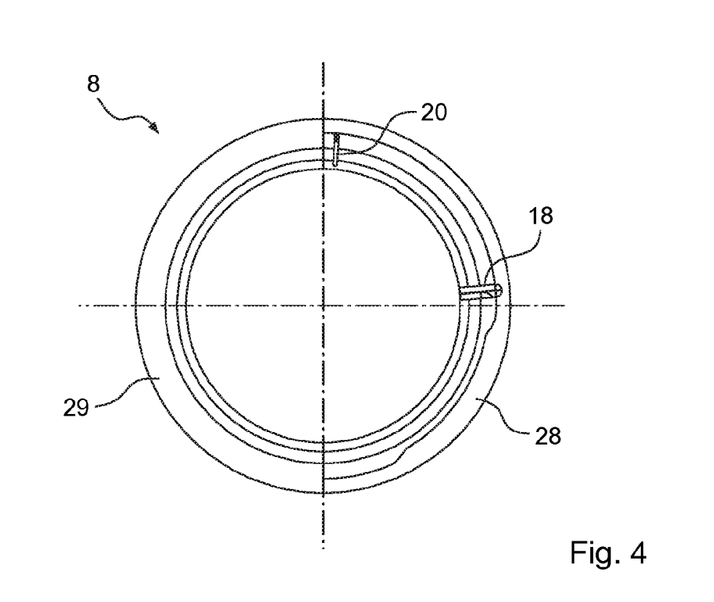
FIG. 4 shows a plan view of a duct carrier of the elastomer bearing.

FIG. 3 shows a perspective view of the elastomer bearing 1, wherein part of the outer sleeve 3 has been omitted, with a result that part of an outer circumferential face of the duct carrier 8 can be seen. FIG. 4 shows a plan view of the annular duct carrier 8, which is composed of two, half shells 28 and 29, wherein the half shell 28 can also be seen in FIG. 3 and in a perspective, individual illustration in FIG. 5.

Figure 5:
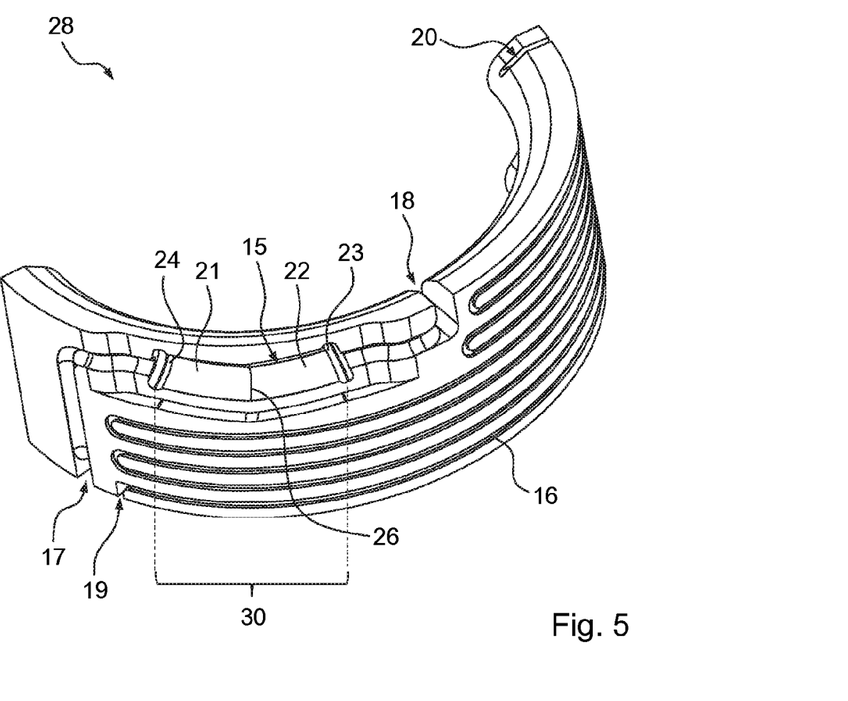
FIG. 5 shows a perspective view of a half shell of the duct carrier.

A first duct 15 and a second duct 16 are provided in the duct carrier 8, wherein the liquid chambers 5 and 6 are connected to one another by each of the ducts 15 and 16. In order to connect the ducts 15 and 16 to the liquid chambers 5 and 6, through-openings 17, 18, 19 and 20 are provided in the duct carrier 8, wherein the first duct 15 is connected to the liquid chamber 5 through the through-opening 17, and the liquid chamber 6 through the through-opening 18. In addition, the second duct 16 is connected to the liquid chamber 5 through the through-opening 19 and the liquid chamber 6 through the through-opening 20.

Figure 6:
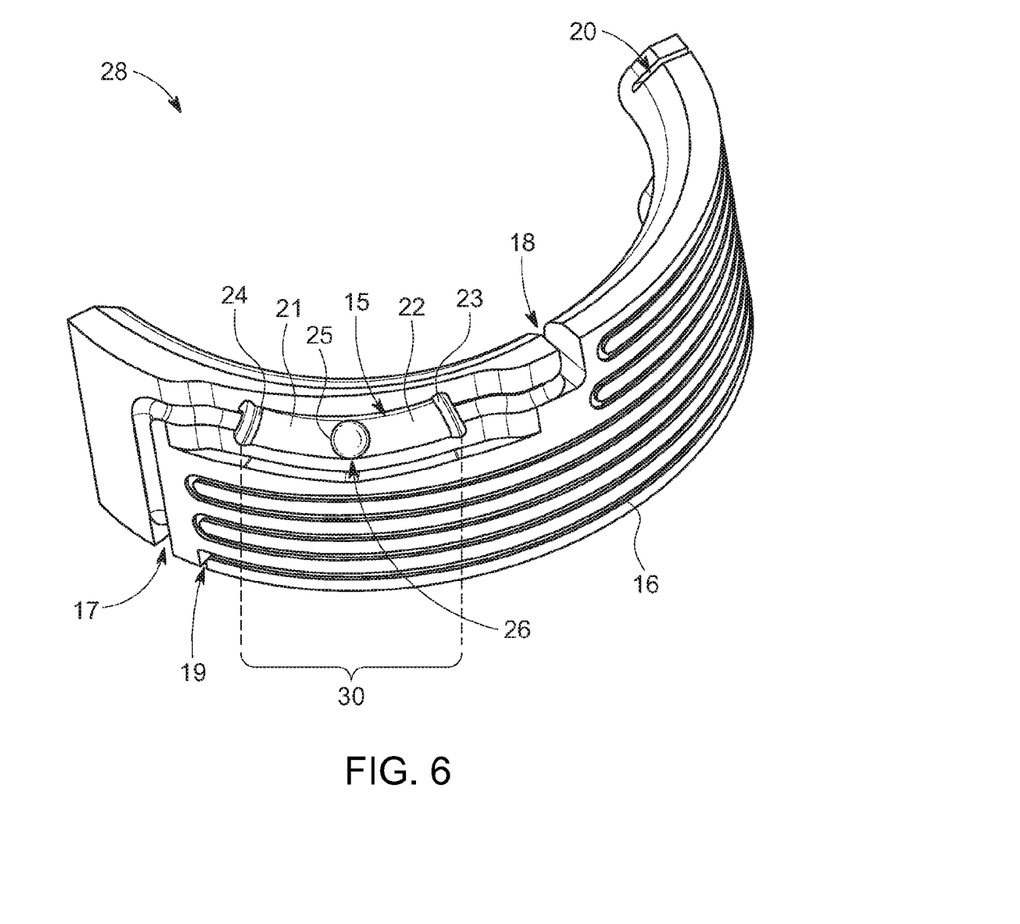
FIG. 6 shows a partial perspective view of a half shell of the duct carrier with the shut off body of the bidirectional ball valve in the defined position.

The second duct 16 is made longer than the first duct 15, and runs in a meandering shape. In addition, a cross section of the second duct 16 is smaller than the cross section of the first duct 15. The first duct 15 has two duct limbs 21 and 22, which merge with one another, are at an angle relative to one another, and are each of straight design. The duct limbs 22 and 21 each have, at their ends facing away from one another, a valve seat 23 or 24, with a result that the first duct 15 runs in a V shape between the valve seats 23 and 24. The duct limbs 21 and 22 therefore form a V-shaped duct section 30, at ends of which the valve seats 23 and 24 are provided. In the first duct 15, a spherical shut-off body 25, which can be moved between the valve seats 23 and 24 along the first duct 15, is arranged between the valve seats 23 and 24. In this context, a diameter of the shut-off body 25 is smaller than or equal to the diameter of the first duct 15 between the valve seats 23 and 24. The elastomer bearing 1 is oriented in such a way that a junction region 26 between the two duct limbs 21 and 22 forms a low point of duct section 30 with respect to a surface of Earth. This results in a gravitational pull of the Earth exerting a force on the shut-off body 25, which pushes the latter into the junction region 26. FIG. 6 illustrates the shut-off body 25, or ball of the bidirectional ball valve, is in the defined position or junction region 26 between two valve seats 23, 24 of the first duct 15.

If liquid flows into the first duct 15 from the liquid chamber 5 (first liquid chamber), liquid flows out of the first duct 15 into the liquid chamber 6 (second liquid chamber). In this context, the shut-off body 25 moves in a direction of the valve seat 23 (first valve seat). If this state persists long enough, the shut-off body 25 comes to bear against the first valve seat 23 and shuts off the first duct 15. In contrast, if liquid flows into the first duct 15 from the second liquid chamber 6, liquid flows from the first duct 15 into the first liquid chamber 5. In this context, the shut-off body 25 moves in a direction of the valve seat 24 (second valve seat). If this state persists for long enough, the shut-off body 25 comes to bear against the second valve seat 24 and shuts off the first duct 15. The duct section 30 and/or the duct limbs 21 and 22, the valve seats 23 and 24 and the shut-off body 25 therefore together form a bidirectionally acting ball valve 27, which is provided in the first duct 15. A volume of liquid is therefore predefined or defined by a diameter and length of the duct limbs 21 and 22, and by a size of the shut-off body, which volume of liquid can be exchanged at maximum between the two chambers 5 and 6 through the first duct 15 before the latter is shut. As long as the shut-off body 25 can move together with liquid in the first duct 15 and, in particular, does not bear against either of the valve seats 23 and 24, rigidity of the elastomer body 1 is lower than if the shut-off body 25 bears against one of the valve seats 23 and 24.

If the shut-off body 25 is moved out of the junction region 26 by mechanical loading of the elastomer bearing 1, and if this mechanical load persists for a relatively long period of time, liquid is exchanged between the liquid chambers 5 and 6 through the second duct 16 until a state of equilibrium is reached. In addition, owing to the gravitational pull of the Earth, the shut-off body 25 moves toward the junction region 26, which therefore forms a zero position for the ball valve 27.

Given suitable geometric configuration of the ball valve 27 and second duct 16, good decoupling of dynamic and/or periodic loading of the elastomer bearing 1 with a high frequency and small amplitude can therefore be achieved owing to the first duct 15, whereas decoupling of dynamic and/or periodic loading of the elastomer bearing 1 with a low frequency and large amplitude can be achieved by the second duct. In addition, static initial loads can be compensated by the second duct.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

The invention claimed is:

1. An elastomer bearing comprising:
   an inner part and an outer part that surrounds the inner part; and
   an elastomer body, arranged between the inner part and the outer part, connected both to the inner part and the outer part, that includes at least two liquid chambers filled with a liquid, and connected by at least two ducts, wherein a bidirectionally-acting valve is provided in a first of the ducts; and
   a shut-off body movably arranged between two valve seats of the bidirectionally-acting valve, arranged at a predefined distance from one another, wherein the shut-off body is moved into a defined position by gravity or by a restoring mechanism;
   wherein the valve seats are provided at ends of a first duct, at ends of the at least two ducts, or at a duct section of the first duct; and
   wherein the first duct or the duct section includes two duct limbs that join at a junction region, and are at an angle with respect to one another, wherein the junction region forms the defined position.

2. The elastomer bearing as claimed in claim 1, wherein the first duct runs in a curved shape or V shape between the valve seats.

3. The elastomer bearing as claimed in claim 2, wherein the first duct has a lowest point between the valve seats, the lowest point being defined by the elastomer bearing oriented with respect to a surface of Earth.

4. The elastomer bearing as claimed in claim 3, wherein the lowest point is defined at the junction region.

5. The elastomer bearing as claimed in claim 1, wherein the bidirectionally-acting valve is a bidirectionally-acting ball valve.

6. The elastomer bearing as claimed in claim 1, wherein the defined position is located between the valve seats.

7. The elastomer bearing as claimed in claim 1, wherein the shut-off body is a ball.

8. The elastomer bearing as claimed in claim 1, wherein the inner part extends in an axial direction, and the liquid chambers are arranged offset axially with respect to one another.

9. The elastomer bearing as claimed in claim 1, wherein the valve seats are provided at ends, facing away from one another, of the duct limbs.

10. The elastomer bearing as claimed in claim 1 further comprising a duct carrier arranged between the elastomer body and the outer part, wherein the at least two ducts are provided in the duct carrier.

11. An elastomer bearing comprising:
    an inner part surrounded by an outer part;
    an elastomer body, arranged between, and connected to, the inner and outer parts and includes filled, liquid chambers, wherein a bidirectionally acting valve is provided in a first duct of at least two ducts that interconnect the liquid chambers;
    a shut-off body movably arranged into a defined position between two valve seats by gravity or a restoring mechanism, of the bidirectionally acting valve, arranged at a distance from one another, wherein the valve seats are provided at ends of the first duct, or a duct section of the first duct that includes two duct limbs that join at a junction region that forms the defined position, and are at an angle with respect to one another; and
    a duct carrier, including the ducts, arranged between the elastomer body and the outer part, wherein the at least two ducts are provided in the duct carrier.

12. The elastomer bearing as claimed in claim 11, wherein the inner part extends in an axial direction and the first duct or the duct section has an apex point located between the valve seats, offset axially with respect to the valve seats.

13. The elastomer bearing as claimed in claim 11, wherein the inner part extends in an axial direction, and the liquid chambers are arranged offset axially with respect to one another.

14. The elastomer bearing as claimed in claim 11, wherein the valve seats are provided at ends, facing away from one another, of the duct limbs.

15. The elastomer bearing as claimed in claim 11, wherein the first duct runs in a curved or V shape between the valve seats.

16. An elastomer bearing comprising:
    an inner part and an outer part that surrounds the inner part, wherein the inner part extends in an axial direction;
    an elastomer body, arranged between the inner part and the outer part, connected both to the inner part and the outer part, that includes at least two liquid chambers filled with a liquid, and connected by at least two ducts, wherein a bidirectionally-acting valve is provided in a first of the ducts; and
    a shut-off body movably arranged between two valve seats of the bidirectionally-acting valve, arranged at a predefined distance from one another, the valve seats being provided at ends of a first duct, at ends of the at least two ducts, or at a duct section of the first duct;
    wherein the shut-off body is moved into a defined position by gravity or by a restoring mechanism; and
    wherein the first duct or the duct section has an apex point located between the valve seats, offset axially with respect to the valve seats.

* * * * *